United States Patent [19]
Ho et al.

[11] Patent Number: 5,259,139
[45] Date of Patent: Nov. 9, 1993

[54] ELECTRIC SHOCK TYPE FISHING TACKLE

[76] Inventors: Chi-Chen Ho, 2F, No. 3, Lane 160, San-Ming Rd., Section 1, Taichung; Mei-Ching Pu, 3F, No. 1, Lane 72, Kuang Fu S. Rd., Taipei, both of Taiwan

[21] Appl. No.: 963,380

[22] Filed: Oct. 20, 1992

[51] Int. Cl.⁵ ............................................. A01K 85/00
[52] U.S. Cl. ...................................................... 43/17.1
[58] Field of Search ................................... 43/17.1, 42

[56] References Cited

U.S. PATENT DOCUMENTS

| | | | |
|---|---|---|---|
| 1,838,981 | 12/1931 | Anderson | 43/17.1 |
| 3,083,491 | 4/1963 | Meysan | 43/17.1 |
| 3,382,598 | 5/1968 | Wilson | 43/17.1 |
| 3,416,254 | 12/1968 | Bornzin | 43/17.1 |
| 3,452,467 | 7/1969 | Makino | 43/17.1 |
| 4,627,187 | 12/1986 | Williams | 43/17.1 |

Primary Examiner—Kurt C. Rowan
Attorney, Agent, or Firm—Morton J. Rosenberg; David I. Klein

[57] ABSTRACT

An electric shock type fishing tackle, particularly a fishing tackle which can generate an electric shock when hook incorporated to it is being pulled by fish, comprising a control box with batteries and voltage rising control circuit to provide high voltage electric current, a fishing line composed of two conductive wires, and a protection box with conductive block over a contact block supported by a spring so as the contact block is pulled whenever the hook is pulled and consequently a closed circuit is formed to provide an electric shock.

3 Claims, 3 Drawing Sheets

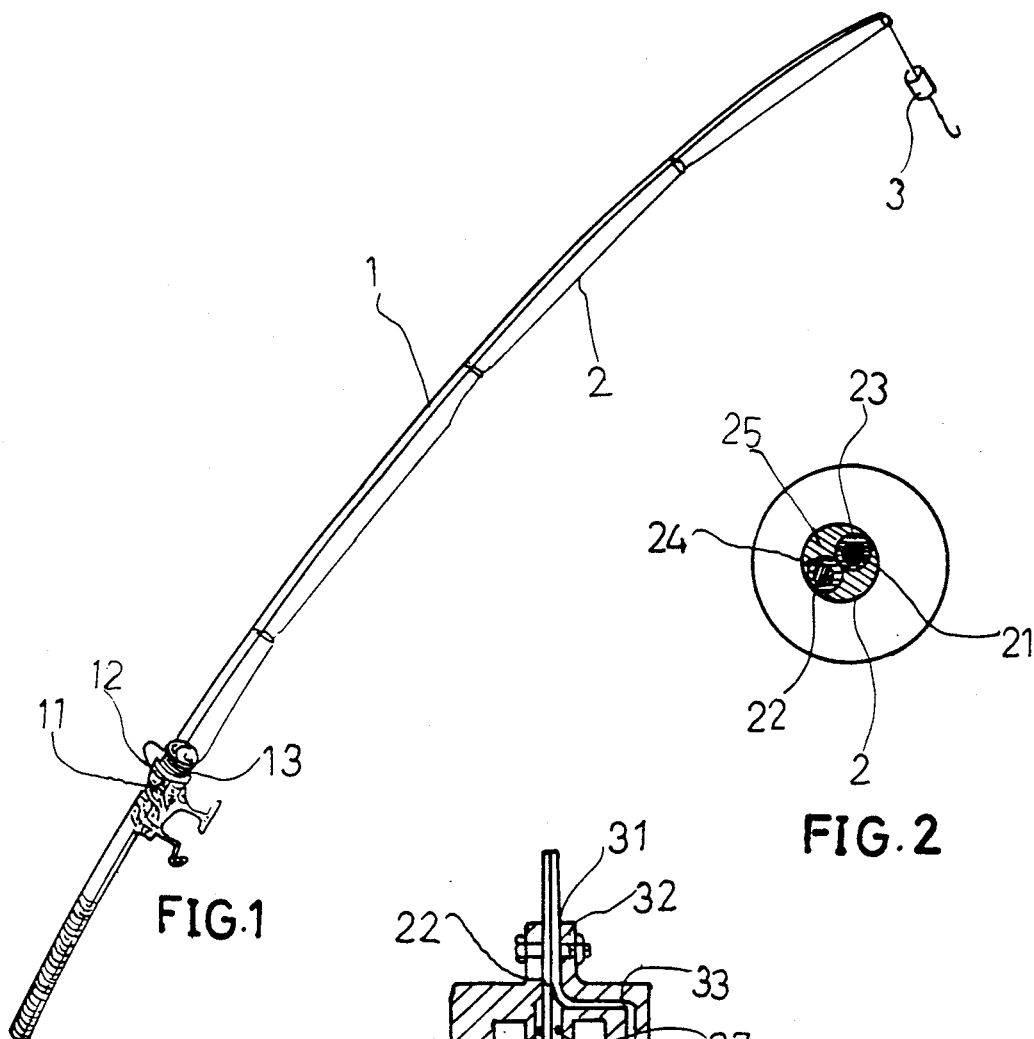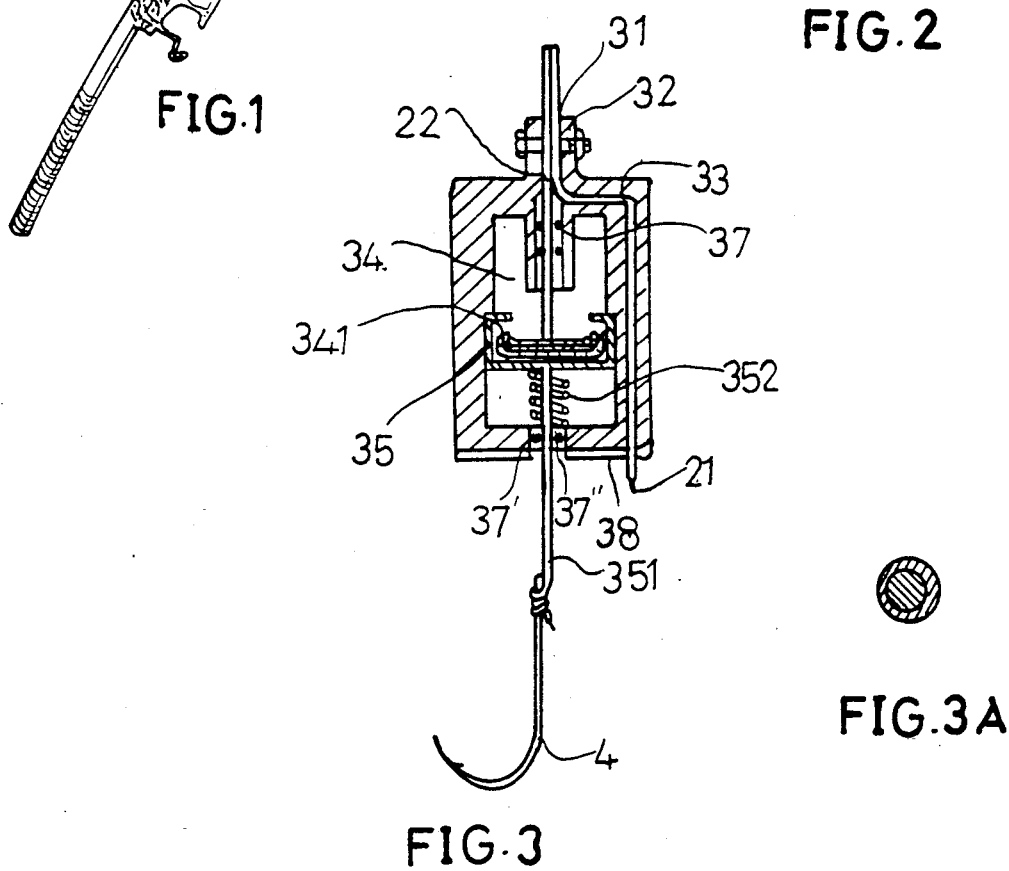

ELECTRIC SHOCK TYPE FISHING TACKLE

BACKGROUND OF THE INVENTION

In fishing, particularly when hook is pulled by a considerable large fish, fishing line may break and hence the fish may escape, or the fisher may be pulled down to the water. In view of such defect, the inventor created an electric shock type fishing tackle having the following features:

(1) A high voltage electric shock is generate to shock the fish when the hook is pulled by the fish so that the fish is shocked and can be pulled out of the water easily.

(2) Electric shock is generated only when the hook is subject to external pulling force and a power switch has been turned on, if is safe and practical.

(3) It is water and electric leakage proof, and it can withstand prolonged operation.

(4) It is incorporated with a fishing line having a particular structure to insulate high voltage and to provide excellent breaking strength.

SUMMARY OF THE INVENTION

The main object of the present invention is to provide an electric shock type fishing tackle, particularly a fishing tackle which can generate an electric shock when hook incorporated to it is being pulled by fish, comprising a control box with batteries and voltage rising control circuit to provide high voltage electric current, a fishing line composed of two conductive wires, and a protection box with conductive block over a contact block supported by a spring so as the contact block is pulled whenever the hook is pulled and consequently a close circuit is formed to provide an electric shock.

BRIEF DESCRIPTION OF THE DRAWINGS

FIG. 1 is a perspective view of an electric shock type fishing tackle according to the present invention.

FIG. 2 is a sectional view of a fishing line according to the present invention.

FIG. 3 is a sectional view of a protection box according to the present invention.

FIG. 3A is a sectional view of a connecting wire according to the present invention.

DETAILED DESCRIPTION OF THE PREFERRED EMBODIMENT

Figure 4:
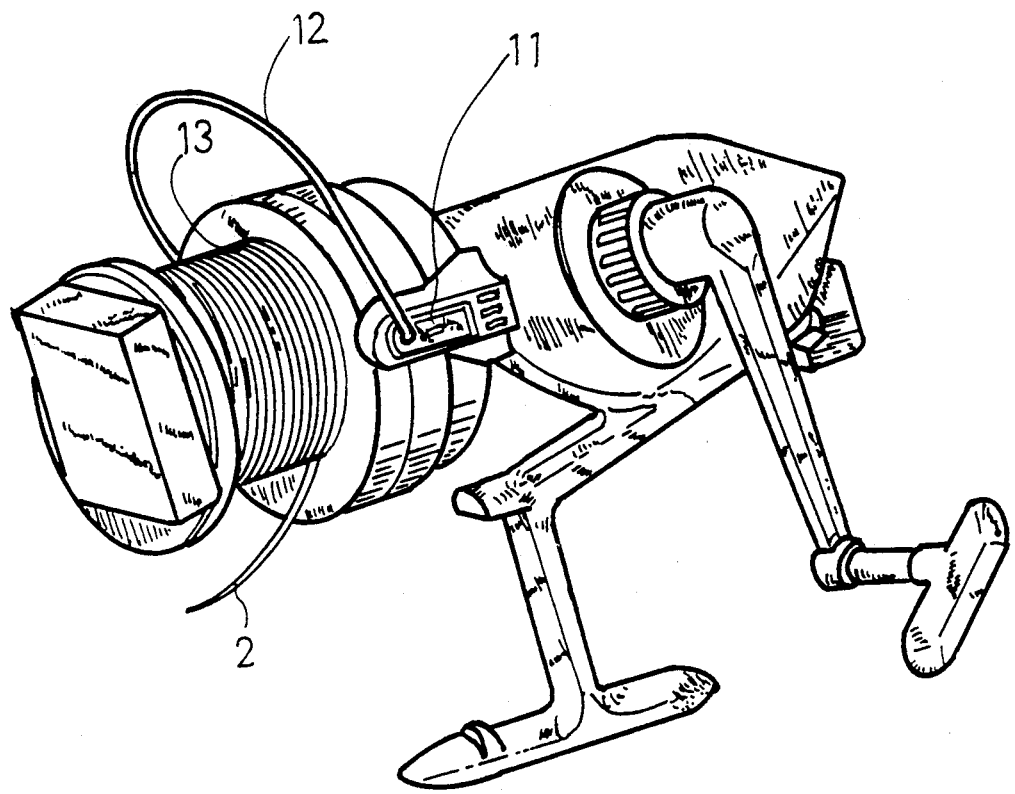
FIG. 4 is a sectional view of a tackle according to the present invention.

Please refer to FIG. 1, the fishing rod according to the present invention has a control box (11) located at an appropriate position. A battery voltage rising control defining an oscillator and transformer circuit circuit and a power switch (12) are fixedly positioned in the control box (11), a tackle (13) is fixed to the control box (11) at an appropriate position for extending and retraction of a fishing line (2).

As shown in FIG. 2, the fishing line (2) is composed for two conductive wires (21 and 22) shielded with highly insulating elements (23 and 24) such as silicone rubber to prevent the passage of electric arc, and then covered by a high strength plastic layer (25) so that the fishing line (2) has a sufficient structural integrity to accept the loads imparted.

As shown in FIG. 3, the present invention includes a protection box (3) having a hole (31) in the middle for fixed coupling of the fishing line to the protection box 3 by means of a locker or bolt (321) through a clipping flange (32). The clipping flange (32) is formed as an integral part of the protection box (3). After fixed coupling of the fishing line (2) to the protection box (3), a high voltage wire containing electrically conductive wire 21 is located within a channel (33) formed in the protection box (3) till an end of which, i.e., the conductive wire (21) is exposed outside the protection box, while another end of the high voltage wire (33) is inserted to the hole (31). An end of the conductive wire (22) is connected to a conductive block (341) in the protection box (3) by soldering. The conductive block (341) is placed in a recession (34), and is formed in an U-like structure above another U-like contact block (35). A connecting wire is connected to the top of the conductive block (341) by soldering, and a spring (352) is placed beneath the contact block (35) so that when the connecting wire (351) is pulled downwards, the contact block (35) is displaced downwards to get contact with the conductive block (341) where a high voltage is applied. Consequently, the high voltage from the conductive wire (21) is led via the connecting wire (351) to a hook to give an electric shock. Therefore, whenever the hook is pulled by a fish, the fish can be shocked, and the fish can be caught easily. As a measure to prevent from electric leakage, two rubber rings (37, 37' or 37") are fixed to both the upper and lower sides of the protection box (3), and a lead (35) is incorporated with the protection box (3) to keep it sinking. As shown in FIG. 3A, the connecting wire is an enamel wire or general conductive wire with high strength covering layer to provide sufficient breaking strength. The hook is tied in the conventional manner. When the hook is not subject to external pulling force, the contact block (35) is separated from the conductive block (341) by tension of the spring (352) to assure safety.

Figure 4A:
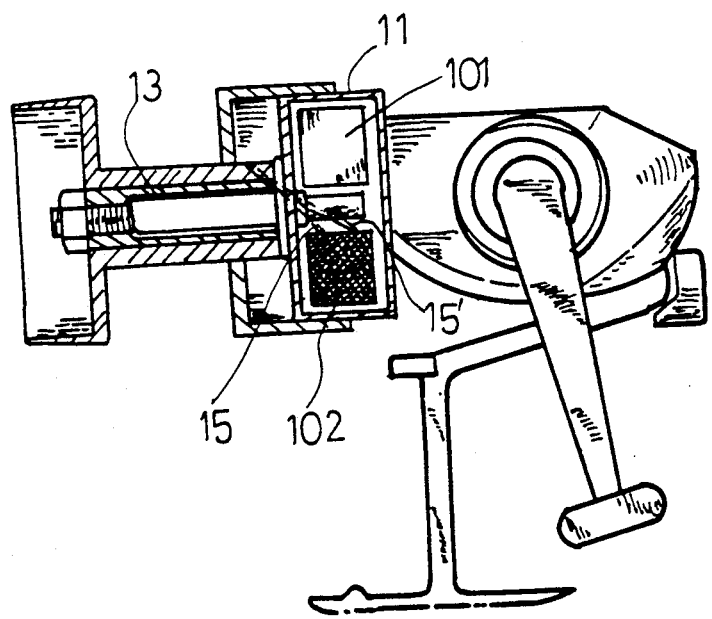
FIG. 4A is a longitudinal sectional view of the present invention.

As shown in FIGS. 4 and 4A for structure of the tackle (13) according to the present invention. Each of the high voltage wires (15 and 15') subject to voltage rising is shielded with a silicone rubber hose to present from occurrence of electric arc from high voltage, and for fixing to a control board.

Figure 5:
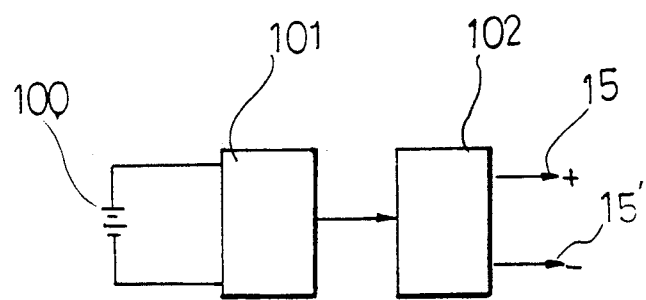
FIG. 5 is a block diagram of the voltage rising control circuit for the present invention.

Please refer to FIG. 5 for a voltage rising control circuit. Voltage of batteries (100) is risen to 10,000 to 20,000 volts by a DC voltage rising circuit. It is first oscillated to rise voltage at an oscillation circuit (101), and then a high voltage output comes from a voltage rising coil or transformer (102). As it is common control circuit, and it is not within the scope of claim hereof, only a block diagram is given to illustrate its function.

We claim:

1. An electric shock fishing tackle system for imparting an electric shock to fish in water comprising:
   (a) a fishing line having a pair of electrically conductive wires, each of said electrically conductive wires being electrically shielded with an electrical insulation layer, said pair of said electrically conductive wires being encapsulated within a plastic layer for increasing the structural integrity of said fishing line;
   (b) a fishing rod having a control box secured thereto, said control box having a D.C. power source and a transformer circuit, said transformer circuit having a pair of output leads coupled to a respective one of said electrically conductive wires;

(c) a protection box having an internal chamber having rubber rings to prevent electrical leakage, said protection box having an opening for insert therein of said pair of said electrically conductive wires, one of said conductive wires positionally located within a channel formed throughout a length of said protection box extending external said protection box into said water, the other of said conductive wires of said fishing line being soldered to an electrically conductive block within said chamber displaced from and above an electrical contact block by a biasing spring member, and;

(d) a hook member coupled to an electrically connecting wire on one end thereof, said connecting wire coupled to said contact block on opposing end, whereby when the hook member is subjected to an external force, the connecting line pulls the contact block into electrical contact with the conductive block wherein an electrical circuit is closed through one of said electrically conductive wires, said conductive block, said contact block, said connecting wire, said hook member, said water to said other of said electrically conductive wires.

2. An electric shock type fishing tackle as claimed in claim 1 wherein the fishing line is fixed to the protection box by means of a clip.

3. An electric shock type fishing tackle as claimed in claim 1 wherein the fishing line is composed of two or more conductive wires each shielded with a silicone rubber layer.

* * * * *